(12) United States Patent
Lee et al.

(10) Patent No.: US 10,007,159 B2
(45) Date of Patent: Jun. 26, 2018

(54) DISPLAY DEVICE

(71) Applicant: LG DISPLAY CO., LTD., Seoul (KR)

(72) Inventors: Minhee Lee, Seoul (KR); Hoansu Shim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 513 days.

(21) Appl. No.: 14/053,965

(22) Filed: Oct. 15, 2013

(65) Prior Publication Data

US 2014/0146253 A1 May 29, 2014

(30) Foreign Application Priority Data

Nov. 23, 2012 (KR) .................. 10-2012-0134023

(51) Int. Cl.
*G02F 1/1362* (2006.01)
*G02F 1/1345* (2006.01)

(52) U.S. Cl.
CPC ...... *G02F 1/136286* (2013.01); *G02F 1/1345* (2013.01)

(58) Field of Classification Search
None
See application file for complete search history.

(56) References Cited

U.S. PATENT DOCUMENTS

| | | | | |
|---|---|---|---|---|
| 2004/0125258 A1* | 7/2004 | Moon | ................. | G02F 1/1345 349/43 |
| 2005/0206798 A1* | 9/2005 | Kim | ................. | G02F 1/136286 349/54 |
| 2008/0137016 A1* | 6/2008 | Kim | ................. | G02F 1/13452 349/139 |
| 2009/0140438 A1* | 6/2009 | Yamazaki | ........... | G02F 1/13458 257/776 |

FOREIGN PATENT DOCUMENTS

| | | | | | |
|---|---|---|---|---|---|
| CN | 102314003 A | * | 1/2012 | ............... | G02F 1/13 |
| CN | 102314003 A | | 1/2012 | | |
| JP | 02-262329 | * | 10/1990 | ........... | H01L 21/027 |
| TW | 201115192 | * | 5/2011 | ............... | G02B 6/00 |

\* cited by examiner

*Primary Examiner* — Edward Glick
*Assistant Examiner* — Anthony G Quash
(74) *Attorney, Agent, or Firm* — Dentons US LLP

(57) ABSTRACT

A display device is disclosed. The display device includes a display panel including first to nth signal lines formed in a display area in which pixels are formed, and first to nth link lines which are formed in a non-display area excluding the display area from the display panel. The first to nth link lines are respectively connected to the first to nth signal lines, where 'n' is an even natural number equal to or greater than 2. At least one of the first to nth link lines includes a hole passing through the at least one link line.

9 Claims, 13 Drawing Sheets

DISPLAY DEVICE

CROSS REFERENCE TO RELATED APPLICATIONS

This application claims the benefit of Korean Patent Application No. 10-2012-0134023 filed on Nov. 23, 2012, which is hereby incorporated by reference for all purposes as if fully set forth herein.

BACKGROUND OF THE INVENTION

Field of the Invention
The present invention relates to a display device.
Discussion of the Related Art With continuous development in an information society, the demand for various types of display devices to display an image is increasing. Various flat panel displays such as a liquid crystal display (LCD), a plasma display panel (PDP), and an organic light emitting display have been recently used.

FIG. 1 illustrates a portion of a flat panel display. As shown in FIG. 1, the flat panel display includes a display panel DIS, a gate driver integrated circuit (IC), a source driver IC, etc. The display panel DIS includes gate lines GL1 to GLm, data lines DL1 to DLn, and pixels P arranged in a matrix form. Each of the pixels P of the display panel DIS receives data voltages supplied to the data lines DL1 to DLn from the source driver IC in response to gate signals supplied to the gate lines GL1 to GLm from the gate driver IC, thereby displaying an image.

The source driver IC is connected to data link lines DLL1 to DLLn through data pads DP1 to DPn, and the data lines DL1 to DLn are connected to the data link lines DLL1 to DLLn. Namely, the data link lines DLL1 to DLLn are connected between the data pads DP1 to DPn and the data lines DL1 to DLn. The data voltages from the source driver IC are supplied to the data lines DL1 to DLn through the data link lines DLL1 to DLLn. The data link lines DLL1 to DLLn are formed in a non-display area NAA of the display panel DIS, and the data lines DL1 to DLn are formed in a display area AA of the display panel DIS.

The gate driver IC is connected to gate link lines GLL1 to GLLm through gate pads GP1 to GPm, and the gate lines GL1 to GLm are connected to the gate link lines GLL1 to GLLm. Namely, the gate link lines GLL1 to GLLm are connected between the gate pads GP1 to GPm and the gate lines GL1 to GLm. The gate signals from the gate driver IC are supplied to the gate lines GL1 to GLm through the gate link lines GLL1 to GLLm. The gate link lines GLL1 to GLLm are formed in the non-display area NAA of the display panel DIS, and the gate lines GL1 to GLm are formed in the display area AA of the display panel DIS.

Because the source driver IC is generally designed to be smaller than the display panel DIS, a distance between the data pads DP1 to DPn is designed to be less than a distance between the data lines DL1 to DLn. Hence, the data link lines DLL1 to DLLn have different lengths as shown in FIG. 1. In general, a resistance of each of the data link lines DLL1 to DLLn is proportional to a length of each data link line and is inversely proportional to a cross-sectional area of each data link line. Namely, the resistance of each data link line varies depending on the length of each data link line. Hence, there is a difference between the resistances of the data link lines DLL1 to DLLn. Even if the source driver IC supplies the same data voltage to the data lines DL1 to DLn, a difference between the data voltages supplied to the data lines DL1 to DLn may be generated because of the resistance difference between the data link lines DLL1 to DLLn. Further, it is difficult to reduce a resistance difference between the gate link lines GLL1 to GLLm in the same manner as the data link lines DLL1 to DLLn.

SUMMARY OF THE INVENTION

Accordingly, the present invention is directed to a display device that substantially obviates one or more problems due to limitations and disadvantages of the related art.

In one aspect, there is a display device comprising a display panel including first to nth signal lines formed in a display area, in which pixels are formed, and first to nth link lines, which are formed in a non-display area excluding the display area from the display panel and are respectively connected to the first to nth signal lines, where 'n' is an even natural number equal to or greater than 2, wherein at least one of the first to nth link lines includes a hole passing through the at least one link line.

In another aspect, there is a display device comprising a display panel including first to nth signal lines formed in a display area, in which pixels are formed, and first to nth link lines, which are formed in a non-display area excluding the display area from the display panel and are respectively connected to the first to nth signal lines, where 'n' is an even natural number equal to or greater than 2, wherein at least one of the first to nth link lines includes a first metal pattern and a second metal pattern, a contact hole exposing the first and second metal patterns, and a third metal pattern connected to the first and second metal patterns through the contact hole.

Additional features and advantages of the invention will be set forth in the description which follows, and in part will be apparent from the description, or may be learned by practice of the invention. It is to be understood that both the forgoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
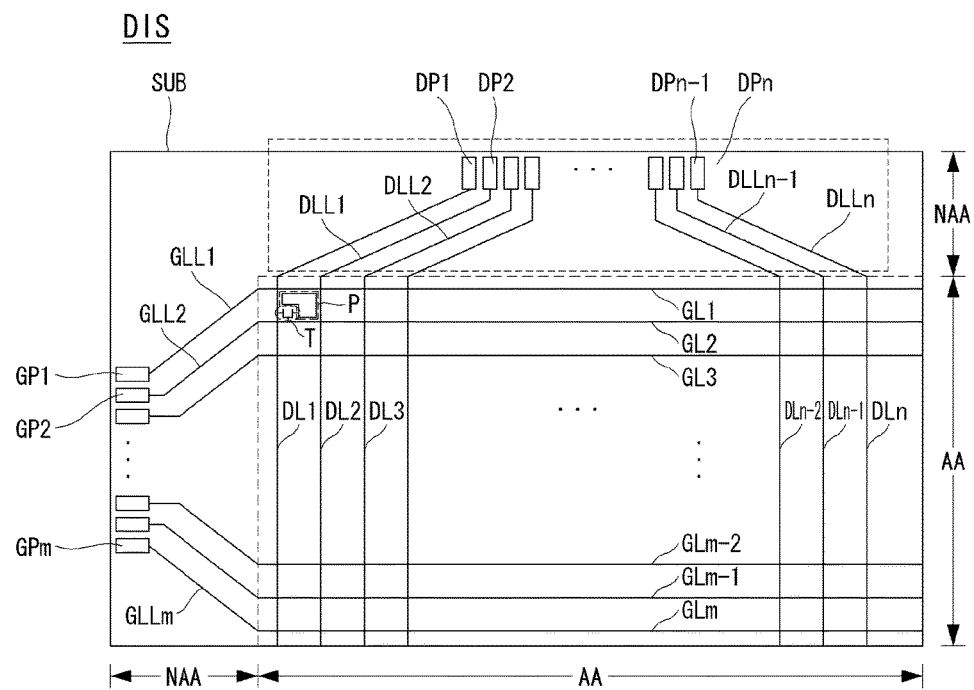
FIG. 1 is a block diagram showing a related art flat panel display.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 2:
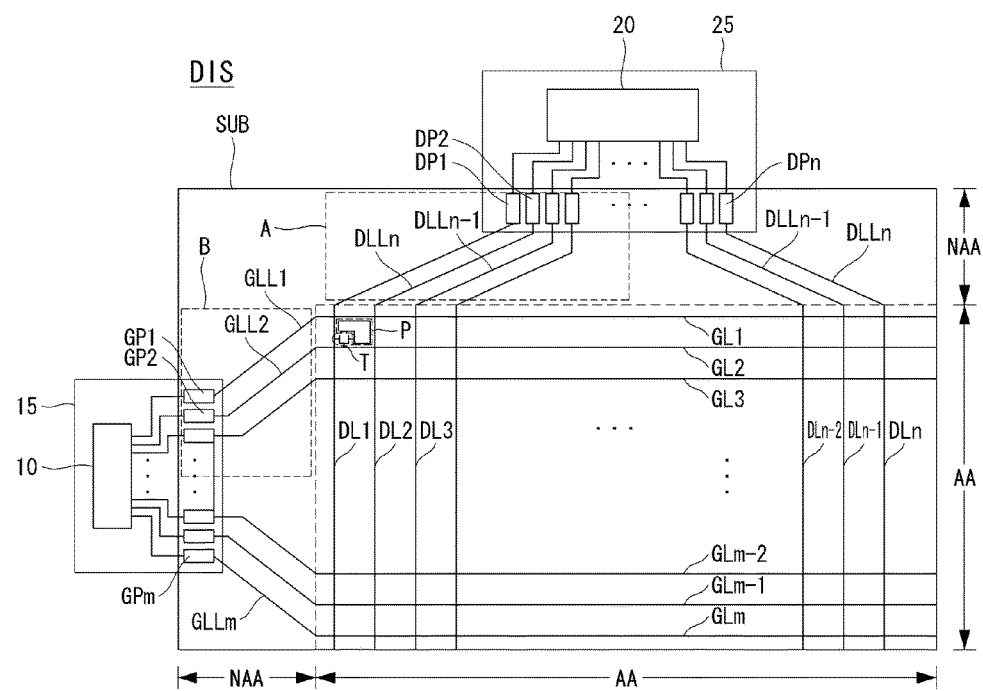
FIG. 2 schematically shows a display panel, a gate driver integrated circuit (IC), and a source driver IC according to an exemplary embodiment of the invention.

FIG. 2 schematically shows a display panel, a gate driver integrated circuit (IC), and a source driver IC according to an exemplary embodiment of the invention. More specifically, FIG. 2 shows a lower substrate SUB of a display panel DIS. As shown in FIG. 2, a display device according to the embodiment of the invention includes the display panel DIS, a gate driver IC 10, a source driver IC 20, etc. The display device according to the embodiment of the invention may be implemented as a flat panel display, such as a liquid crystal display (LCD), a field emission display (FED), a plasma display panel (PDP), and an organic light emitting display. In the following description, the embodiment of the invention will be described using the liquid crystal display as an example of the flat panel display. Other types of flat panel displays may be used.

The display panel DIS includes an upper substrate and the lower substrate SUB, which are positioned opposite each other with a liquid crystal layer interposed between them. The display panel DIS includes pixels and is divided into a display area, AA, displaying an image and a non-display area, NAA, excluding the display area AA from the display panel DIS. An image is displayed on the display area AA of the display panel DIS using the pixels arranged in a matrix form based on a crossing structure of gate lines GL1 to GLm and data lines DL1 to DLn, where 'm' is a natural number equal to or greater than 2, and 'n' is an even natural number equal to or greater than 2. In the display area AA of the display panel DIS, the data lines DL1 to DLn, the gate lines GL1 to GLm, thin film transistors (TFTs), pixel electrodes connected to the TFTs, storage capacitors connected to the pixel electrodes, etc. may be formed. Each pixel adjusts a transmission amount of light by driving liquid crystals of the liquid crystal layer by a voltage difference between the pixel electrode charged to a data voltage through the TFT and a common electrode, to which a common voltage is applied, thereby displaying the image.

In the non-display area NAA of the display panel DIS, data link lines DLL1 to DLLn respectively connected to the data lines DL1 to DLn and data pads DP1 to DPn respectively connected to the data link lines DLL1 to DLLn are formed. Namely, the data link lines DLL1 to DLLn are connected to the source driver IC 20 through the data pads DP1 to DPn. Further, gate link lines GLL1 to GLLm respectively connected to the gate lines GL1 to GLm and gate pads GP1 to GPm respectively connected to the gate link lines GLL1 to GLLm are formed in the non-display area NAA of the display panel DIS. Namely, the gate link lines GLL1 to GLLm are connected to the gate driver IC 10 through the gate pads GP1 to GPm.

Black matrixes, color filters, etc. are formed on the upper substrate of the display panel DIS. In a vertical electric field driving manner such as a twisted nematic (TN) mode and a vertical alignment (VA) mode, the common electrode is formed on the upper substrate. In a horizontal electric field driving manner such as an in-plane switching (IPS) mode and a fringe field switching (FFS) mode, the common electrode is formed on the lower substrate SUB along with the pixel electrode. The display device according to the embodiment of the invention may be implemented in any liquid crystal mode including the TN mode, the VA mode, the IPS mode, and the FFS mode. Polarizing plates are respectively attached to the upper substrate and the lower substrate of the display panel DIS. Alignment layers for setting a pre-tilt angle of the liquid crystals are respectively formed on the upper substrate and the lower substrate of the display panel DIS.

When the display panel DIS is implemented as a liquid crystal display panel, a backlight unit for uniformly irradiating light onto the display panel DIS may be disposed in the rear of the display panel DIS. The backlight unit may be implemented as an edge type backlight unit or a direct type backlight unit.

As shown in FIG. 2, the source driver IC 20 is mounted on a tape carrier package (TCP) 25 and is bonded to the lower substrate SUB of the display panel DIS through a tape automated bonding (TAB) process. Hence, the source driver IC 20 may be connected to the data pads DP1 to DPn. Alternatively, the source driver IC 20 is attached to the lower substrate SUB of the display panel DIS through a chip-on glass (COG) process and may be connected to the data pads DP1 to DPn.

The source driver IC 20 receives digital video data and a source timing control signal from a timing controller (not shown). The source driver IC 20 converts the digital video data into positive and negative data voltages in response to the source timing control signal. The source driver IC 20 is connected to the data link lines DLL1 to DLLn through the data pads DP1 to DPn. Thus, the data voltages from the source driver IC 20 are supplied to the data lines DL1 to DLn via the data link lines DLL1 to DLLn.

As shown in FIG. 2, the gate driver IC 10 is mounted on a TCP 15 and is bonded to the lower substrate SUB of the display panel DIS through the TAB process. Hence, the gate driver IC 10 may be connected to the gate pads GP1 to GPm. Alternatively, the gate driver IC 10 may be directly formed on the lower substrate SUB through a gate-in panel (GIP) process at the same time as the pixels.

The gate driver IC 10 receives a gate timing control signal from the timing controller (not shown). The gate driver IC 10 sequentially supplies a gate pulse (or scan pulse) to the gate lines GL1 to GLm in response to the gate timing control signal. The gate driver IC 10 is connected to the gate link lines GLL1 to GLLm through the gate pads GP1 to GPm. Thus, the gate pulse from the gate driver IC 10 is supplied to the gate lines GL1 to GLm via the gate link lines GLL1 to GLLm.

The timing controller receives the digital video data and timing signals, such as a vertical sync signal, a horizontal sync signal, a data enable signal, and a dot clock, from an external host system. The timing controller generates the source timing control signal for controlling operation timing of the source driver IC 20 and the gate timing control signal for controlling operation timing of the gate driver IC 10 based on the digital video data and the timing signals. The timing controller supplies the digital video data and the source timing control signal to the source driver IC 20 and supplies the gate timing control signal to the gate driver IC 10. The timing controller may be mounted on a control PCB. The control PCB may be connected to a source PCB connected to the TCP 25, on which the source driver IC 20 is mounted, through a flexible circuit substrate such as a flexible flat cable (FFC) and a flexible printed circuit (FPC).

Figure 3:
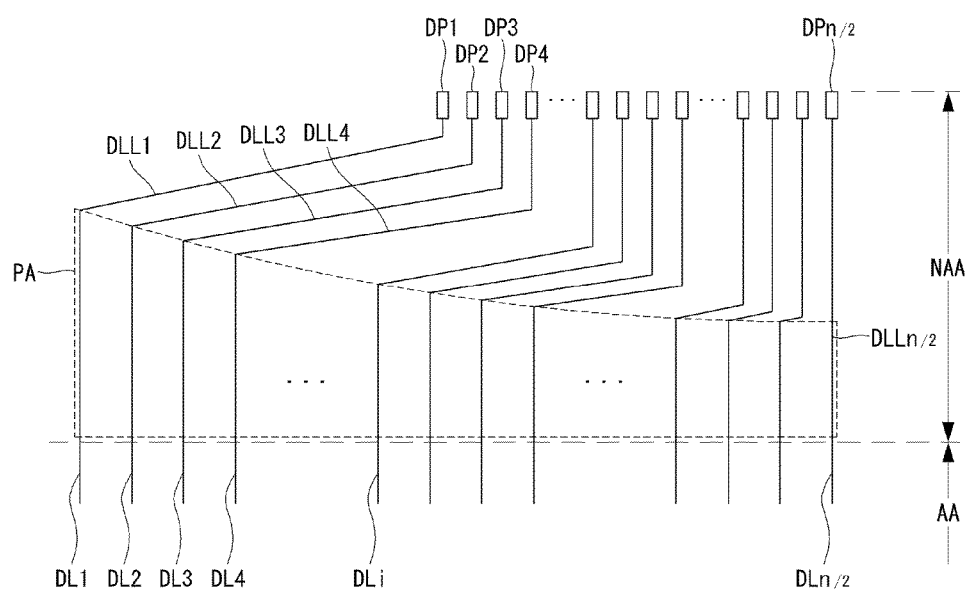
FIG. 3 shows in detail a portion 'A' of FIG. 2.

FIG. 3 shows in detail a portion 'A' of FIG. 2. More specifically, FIG. 3 shows in detail first to (n/2)th data pads DP1 to DPn/2 and first to (n/2)th data link lines DLL1 to DLLn/2 formed in the portion 'A' of the lower substrate SUB of the display panel DIS.

As shown in FIG. 3, one end of the first to (n/2)th data link lines DLL1 to DLLn/2 is respectively connected to the first to (n/2)th data pads DP1 to DPn/2. Further, the other end of the first to (n/2)th data link lines DLL1 to DLLn/2 is respectively connected to the first to (n/2)th data lines DL1 to DLn/2. The first to (n/2)th data lines DL1 to DLn/2 are formed in the display area AA of the display panel DIS, and the first to (n/2)th data link lines DLL1 to DLLn/2 and the first to (n/2)th data pads DP1 to DPn/2 are formed in the non-display area NAA of the display panel DIS.

As shown in FIG. 2, the first to (n/2)th data pads DP1 to DPn/2 are connected to the source driver IC 20. The first data pad DP1 connected to the first data link line DLL1 is connected to one edge of the source driver IC 20, and the (n/2)th data pad DPn/2 connected to the (n/2)th data link line DLLn/2 is connected to a middle portion of the source driver IC 20. Further, the nth data pad DPn connected to the nth data link line DLLn is connected to the other edge of the source driver IC 20.

The lengths of the first to (n/2)th data link lines DLL1 to DLLn/2 decrease as they go from the first data link line DLL1 to the (n/2)th data link line DLLn/2. In general, a line resistance is proportional to a length of the line and is inversely proportional to a cross-sectional area of the line. Therefore, the first data link line DLL1 has a maximum resistance, and the (n/2)th data link line DLLn/2 has a minimum resistance. Namely, the first to nth data link lines DLL1 to DLLn have different resistances depending on their positions.

In this instance, even if the source driver IC 20 supplies the same data voltage to the first to (n/2)th data link lines DLL1 to DLLn/2 through the first to (n/2)th data pads DP1 to DPn/2, a difference between the data voltages supplied to the first to (n/2)th data lines DL1 to DLn/2 may be generated because of a resistance difference between the first to (n/2)th data link lines DLL1 to DLLn/2. After all, when the source driver IC 20 supplies the same data voltage to the first to (n/2)th data link lines DLL1 to DLLn/2, the pixels connected to the first to (n/2)th data lines DL1 to DLn/2 have to represent the same gray level, but represent different gray levels depending on their positions.

Further, the (n/2)th to nth data link lines DLLn/2 to DLLn may have different resistances depending on their positions in the same manner as the first to (n/2)th data link lines DLL1 to DLLn/2. Thus, first to fourth embodiments of the invention capable of solving the problem generated by the resistance difference between the first to nth data link lines DLL1 to DLLn are described in detail below with reference to FIGS. 4A and 4B, FIGS. 5A and 5B, FIGS. 6A and 6B, and FIGS. 9A and 9B.

The embodiments of the invention are described on the basis that the first to (n/2)th data link lines DLL1 to DLLn/2 are formed in conformity with a design manner shown in FIG. 3. The design manner in FIG. 3 is configured so that a distance between the adjacent data link lines increases as they go from the (n/2)th data link line DLLn/2 to the first data link line DLL1. The design manner in FIG. 3 is characterized in that areas PA formed parallel to the data lines widen as they go from the (n/2)th data link line DLLn/2 to the first data link line DLL1. In the first to fourth embodiments of the invention, the first to nth data link lines DLL1 to DLLn may be applied to the areas PA formed parallel to the first to nth data lines DL1 to DLn through the design manner of in FIG. 3. The design manner of in FIG. 3 was described in detail in Korean Patent Publication No. 10-2009-0073771. However, the formation of the first to (n/2)th data link lines DLL1 to DLLn/2 according to the embodiments of the invention is not limited to the design manner of in FIG. 3. The first to (n/2)th data link lines DLL1 to DLLn/2 may be formed using other design manners, for example, the related art manner shown in FIG. 1.

Figure 4A:
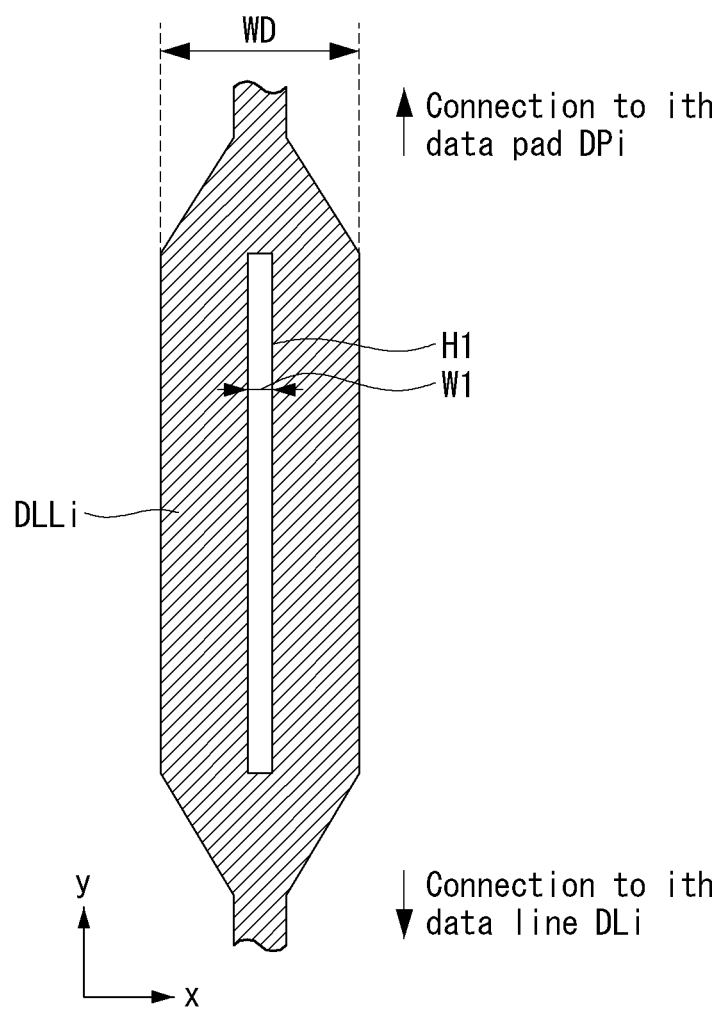
FIGS. 4A and 4B show in detail an ith data link line and a kth data link line according to a first embodiment of the invention.
Figure 4B:
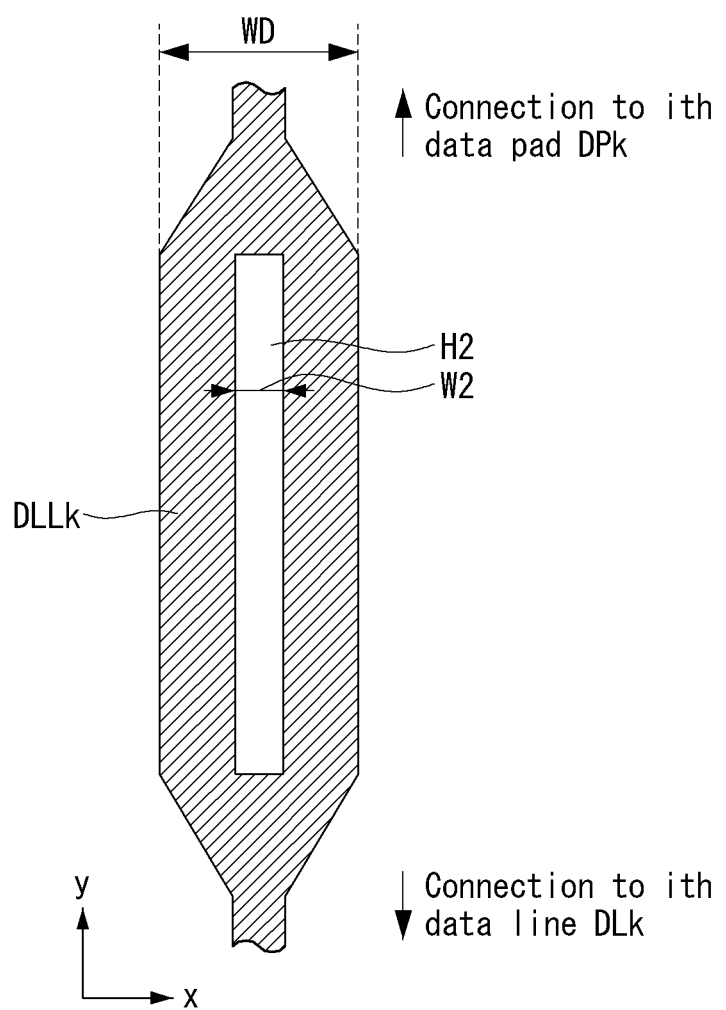

FIGS. 4A and 4B show in detail an ith data link line and a kth data link line according to the first embodiment of the invention. More specifically, FIG. 4A shows an ith data link line DLLi, where 'i' is a natural number satisfying $1 \leq i < n/2$, and FIG. 4B shows a kth data link line DLLk, where 'k' is a natural number satisfying $i < k \leq n/2$. The ith data link line DLLi indicates one of first to (n/2−1)th data link lines DLL1 to DLLn/2−1, and the kth data link line DLLk indicates one of ith to (n/2)th data link lines DLLi to DLLn/2. One end of the ith data link line DLLi is connected to an ith data pad DPi, and the other end of the ith data link line DLLi is connected to an ith data line DLi. One end of the kth data link line DLLk is connected to a kth data pad DPk, and the other end of the kth data link line DLLk is connected to a kth data line DLk. The first to nth data link lines DLL1 to DLLn may be formed using one of a gate metal pattern, a source drain metal pattern, and a transparent electrode pattern.

As shown in FIGS. 4A and 4B, at least one of the first to (n/2)th data link lines DLL1 to DLLn/2 includes holes H1 and H2 passing through the at least one data link line. The holes H1 and H2 have a slit shape and may extend along a longitudinal direction (for example, y-axis direction) of the data link lines. The first to (n/2)th data link lines DLL1 to DLLn/2 may be designed to have the same width WD. A width W1 of the hole H1 of the ith data link line DLLi may be designed to be less than a width W2 of the hole H2 of the kth data link line DLLk. Thus, a cross-sectional area of the ith data link line DLLi may be larger than a cross-sectional area of the kth data link line DLLk. Namely, in the first embodiment of the invention, because a length of the ith data link line DLLi is longer than a length of the kth data link line DLLk, the cross-sectional area of the ith data link line DLLi is designed to be larger than the cross-sectional area of the kth data link line DLLk.

In other words, the lengths of the ith to kth data link lines DLLi to DLLk decrease as they go from the ith data link line DLLi to the kth data link line DLLk. Therefore, the first embodiment of the invention gradually increases the widths of the holes of the ith to kth data link lines DLLi to DLLk, thereby gradually reducing the cross-sectional areas of the ith to kth data link lines DLLi to DLLk. As a result, the first embodiment of the invention can uniformly design the resistances of the first to (n/2)th data link lines DLL1 to DLLn/2. Further, lengths of pth to qth data link lines DLLp to DLLq increase as they go from the pth data link line DLLp to the qth data link line DLLq, where 'p' is a natural number satisfying $n/2 \leq p < n$, and 'q' is a natural number satisfying $p < q \leq n$. Therefore, the first embodiment of the invention gradually reduces widths of holes of the pth to qth data link lines DLLp to DLLq, thereby gradually increasing cross-sectional areas of the pth to qth data link lines DLLp to DLLq. As a result, the first embodiment of the invention can uniformly design the resistances of the (n/2)th to nth data link lines DLLn/2 to DLLn. Namely, the first embodiment of the invention can minimize the resistance difference between the first to nth data link lines DLL1 to DLLn.

Figure 5A:
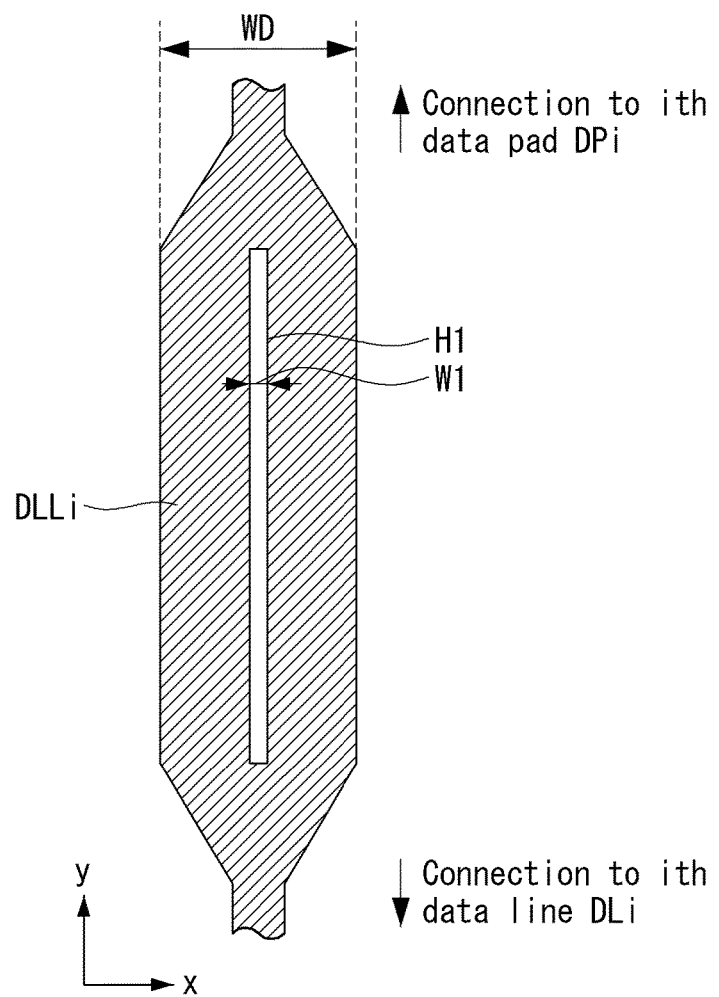
FIGS. 5A and 5B show in detail an ith data link line and a kth data link line according to a second embodiment of the invention.
Figure 5B:
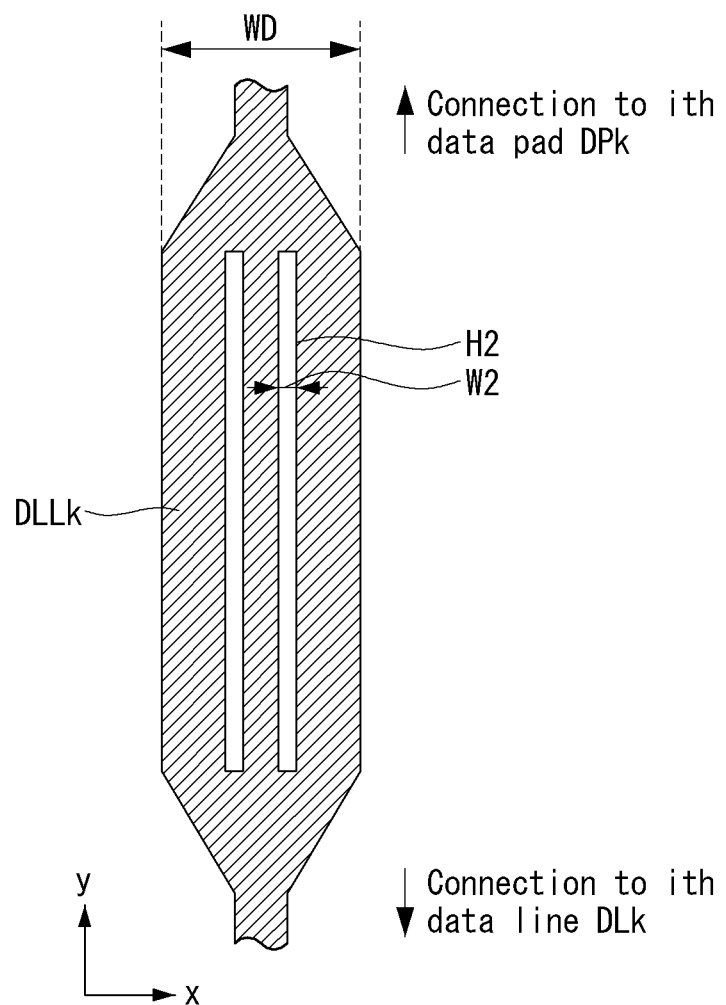

FIGS. 5A and 5B show in detail a pth data link line and a (n/2)th data link line according to the second embodiment of the invention. More specifically, FIG. 5A shows an ith data link line DLLi, where 'i' is a natural number satisfying $1 \leq i < n/2$, and FIG. 5B shows a kth data link line DLLk, where 'k' is a natural number satisfying $i < k \leq n/2$. The ith data link line DLLi indicates one of first to (n/2−1)th data link lines DLL1 to DLLn/2−1, and the kth data link line DLLk indicates one of ith to (n/2)th data link lines DLLi to DLLn/2. One end of the ith data link line DLLi is connected to an ith data pad DPi, and the other end of the ith data link line DLLi is connected to an ith data line DLi. One end of the kth data link line DLLk is connected to a kth data pad DPk, and the other end of the kth data link line DLLk is connected to a kth data line DLk. The first to nth data link lines DLL1 to DLLn may be formed using one of a gate metal pattern, a source drain metal pattern, and a transparent electrode pattern.

As shown in FIGS. 5A and 5B, at least one of the first to (n/2)th data link lines DLL1 to DLLn/2 includes holes H1 and H2 passing through the at least one data link line. The holes H1 and H2 have a slit shape and may extend along a longitudinal direction (for example, y-axis direction) of the data link lines. The first to (n/2)th data link lines DLL1 to DLLn/2 may be designed to have the same width WD. The number of holes H1 of the ith data link line DLLi may be designed to be less than the number of holes H2 of the kth data link line DLLk. In this instance, widths W1 and W2 of the holes H1 and H2 of the ith to kth data link lines DLLi to DLLk may be substantially the same. Thus, a cross-sectional area of the ith data link line DLLi may be larger than a cross-sectional area of the kth data link line DLLk. Namely, in the second embodiment of the invention, because a length of the ith data link line DLLi is longer than a length of the kth data link line DLLk, the cross-sectional area of the ith data link line DLLi is designed to be larger than the cross-sectional area of the kth data link line DLLk.

In other words, the lengths of the ith to kth data link lines DLLi to DLLk decrease as they go from the ith data link line DLLi to the kth data link line DLLk. Therefore, the second embodiment of the invention gradually increases the number of holes in the ith to kth data link lines DLLi to DLLk, thereby gradually reducing the cross-sectional areas of the ith to kth data link lines DLLi to DLLk. As a result, the second embodiment of the invention can uniformly design the resistances of the first to (n/2)th data link lines DLL1 to DLLn/2. Further, lengths of pth to qth data link lines DLLp to DLLq increase as they go from the pth data link line DLLp to the qth data link line DLLq, where 'p' is a natural number satisfying $n/2 \leq p < n$, and 'q' is a natural number satisfying $p < q \leq n$. Therefore, the second embodiment of the invention gradually reduces the number of holes in the pth to qth data link lines DLLp to DLLq, thereby gradually increasing cross-sectional areas of the pth to qth data link lines DLLp to DLLq. As a result, the second embodiment of the invention can uniformly design the resistances of the (n/2)th to nth data link lines DLLn/2 to DLLn. Namely, the second embodiment of the invention can minimize the resistance difference between the first to nth data link lines DLL1 to DLLn.

Figure 6A:
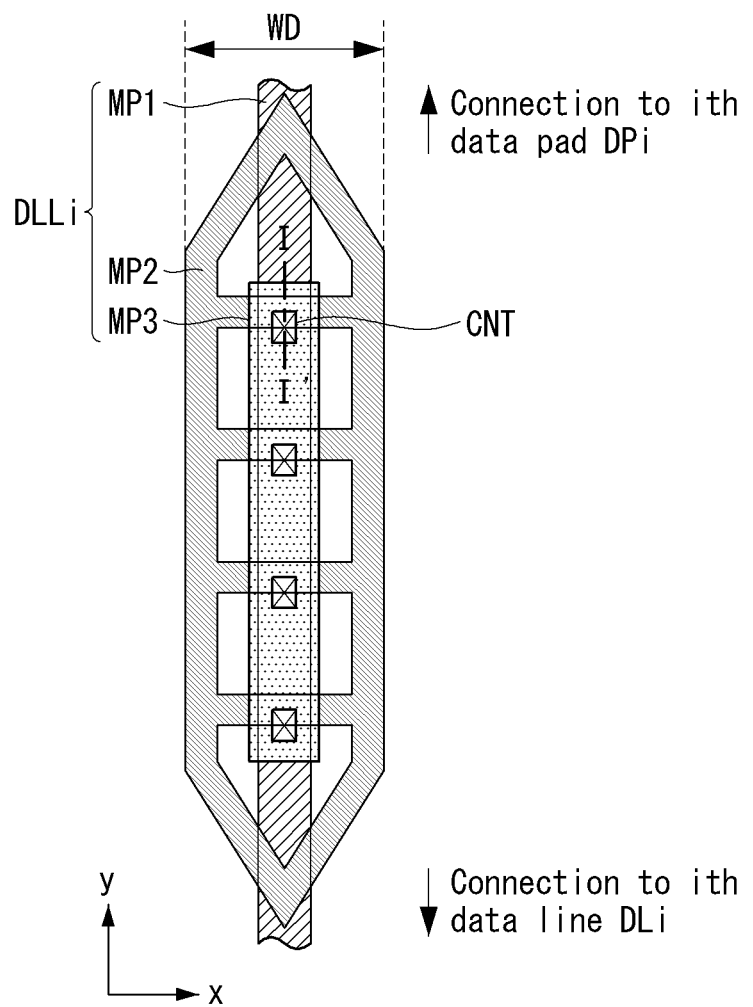
FIGS. 6A and 6B show in detail an ith data link line and a kth data link line according to a third embodiment of the invention.
Figure 6B:
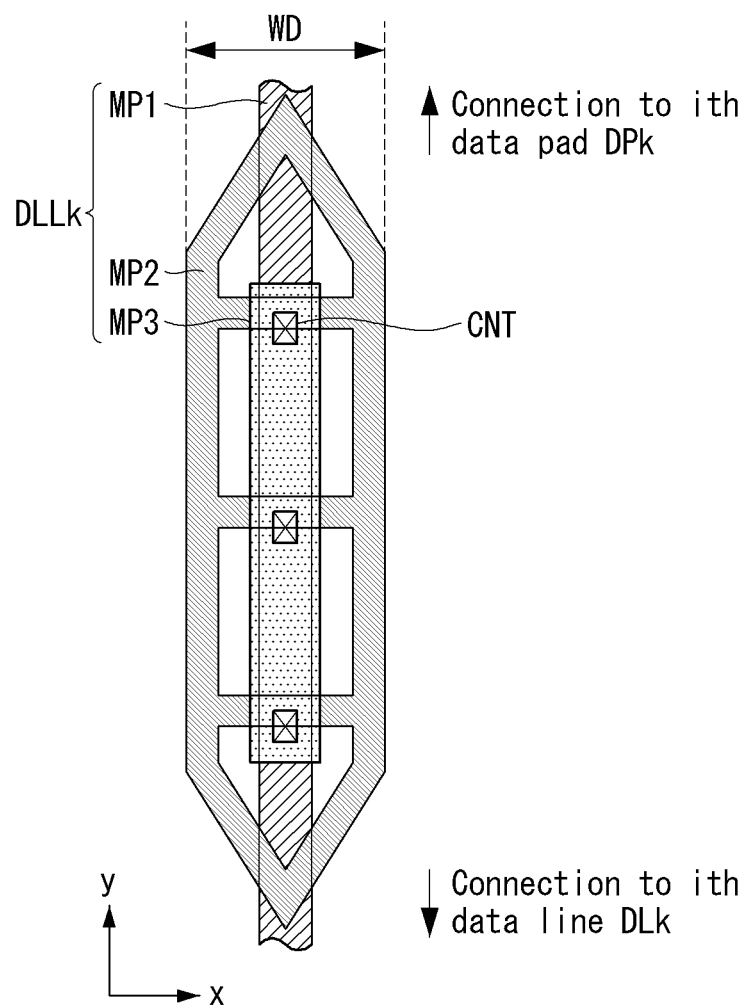

FIGS. 6A and 6B show in detail an ith data link line and a kth data link line according to the third embodiment of the invention. More specifically, FIG. 6A shows an ith data link line DLLi, where 'i' is a natural number satisfying $1 \leq i < n/2$, and FIG. 6B shows a kth data link line DLLk, where 'k' is a natural number satisfying $i < k \leq n/2$. The ith data link line DLLi indicates one of first to (n/2−1)th data link lines DLL1 to DLLn/2−1, and the kth data link line DLLk indicates one of ith to (n/2)th data link lines DLLi to DLLn/2. One end of the ith data link line DLLi is connected to an ith data pad DPi, and the other end of the ith data link line DLLi is connected to an ith data line DLi. One end of the kth data link line DLLk is connected to a kth data pad DPk, and the other end of the kth data link line DLLk is connected to a kth data line DLk.

As shown in FIGS. 6A and 6B, at least one of the first to (n/2)th data link lines DLL1 to DLLn/2 includes a first metal pattern MP1, a second metal pattern MP2, a contact hole CNT exposing the first and second metal patterns MP1 and MP2, and a third metal pattern MP3 connected to the first and second metal patterns MP1 and MP2 through the contact hole CNT.

As shown in FIGS. 6A and 6B, the first to third metal patterns MP1, MP2, and MP3 may extend along a longitudinal direction (for example, y-axis direction) of the data link lines. The first metal pattern MP1 may partially overlap the second metal pattern MP2. The third metal pattern MP3 may partially overlap the first and second metal patterns MP1 and MP2. The second metal pattern MP2 has a width greater than the first metal pattern MP1 and is symmetrically formed with respect to the first metal pattern MP1 on both sides of the first metal pattern MP1. Further, rectangular holes and pentagonal holes are formed in the middle of the second metal pattern MP2. The first to third metal patterns MP1 to MP3 are not limited to the configuration shown in FIGS. 6A and 6B. Other configurations may be used for the first to third metal patterns MP1 to MP3.

Because the first to third metal patterns MP1 to MP3 contact one another in the contact hole CNT, a contact resistance between the first to third metal patterns MP1 to MP3 is generated in the contact hole CNT. In this instance, the contact hole CNT formed in each of the ith to kth data link lines DLLi to DLLk may serve as a resistor. Further, the contact holes CNT formed in the ith to kth data link lines DLLi to DLLk may have the same effect as resistors connected in parallel. An increase in the number of contact holes CNT means an increase in the number of resistors connected in parallel.

When the contact holes CNT formed in the ith to kth data link lines DLLi to DLLk substantially have the same size, contact areas between the first to third metal patterns MP1 to MP3 and the contact holes CNT are substantially the same. Therefore, the contact resistances between the first to third metal patterns MP1 to MP3 and the contact holes CNT may be substantially the same. Thus, when resistors having the same resistance are connected in parallel to one another, a combined resistance of the resistors decreases as the number of resistors increases.

The first to (n/2)th data link lines DLL1 to DLLn/2 may be designed to have the same width WD. The number of contact holes CNT of the ith data link line DLLi may be designed to be more than the number of contact holes CNT of the kth data link line DLLk. In this instance, the sizes of the contact holes CNT of the ith to kth data link lines DLLi to DLLk may be substantially the same. Hence, a combined resistance of the ith data link line DLLi is less than a combined resistance of the kth data link line DLLk. Namely, in the third embodiment of the invention, because a length of the ith data link line DLLi is longer than a length of the kth data link line DLLk, the combined resistance of the ith data link line DLLi is designed to be less than the combined resistance of the kth data link line DLLk.

In other words, the lengths of the ith to kth data link lines DLLi to DLLk decrease as they go from the ith data link line DLLi to the kth data link line DLLk. Therefore, the third embodiment of the invention gradually reduces the number of contact holes CNT in the ith to kth data link lines DLLi to DLLk, thereby gradually increasing the combined resistances of the ith to kth data link lines DLLi to DLLk. As a result, the third embodiment of the invention can uniformly design the resistances of the first to (n/2)th data link lines DLL1 to DLLn/2. Further, lengths of pth to qth data link lines DLLp to DLLq increase as they go from the pth data link line DLLp to the qth data link line DLLq, where 'p' is a natural number satisfying n/2≤p<n, and 'q' is a natural number satisfying p<q≤n. Therefore, the third embodiment of the invention gradually increases the number of contact holes CNT in the pth to qth data link lines DLLp to DLLq, thereby gradually reducing combined resistances of the pth to qth data link lines DLLp to DLLq. As a result, the third embodiment of the invention can uniformly design the resistances of the (n/2)th to nth data link lines DLLn/2 to DLLn. Namely, the third embodiment of the invention can minimize the resistance difference between the first to nth data link lines DLL1 to DLLn.

Figure 7:
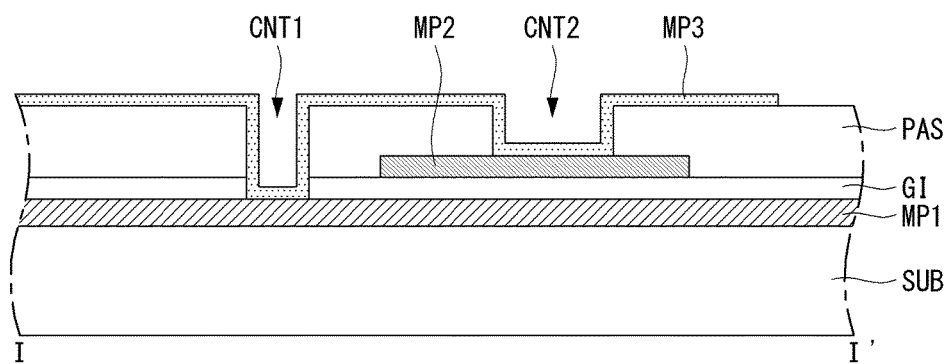
FIG. 7 is a cross-sectional view taken along line I-I' of FIG. 6A.

FIG. 7 is a cross-sectional view taken along line I-I' of FIG. 6A. More specifically, FIG. 7 shows a first metal pattern MP1 formed of a gate metal pattern, a second metal pattern MP2 formed of a data metal pattern, and a third metal pattern MP3 formed of a transparent electrode pattern for the sake of brevity and ease of reading. Other types of metal patterns may be used for the first to third metal patterns MP1 to MP3. For example, the first metal pattern MP1 may be formed of a data metal pattern, the second metal pattern MP2 may be formed of a gate metal pattern, and the third metal pattern MP3 may be formed of a transparent electrode pattern.

As shown in FIG. 7, the first metal pattern MP1 is formed on the lower substrate SUB, and a gate insulating layer GI is formed on the first metal pattern MP1. The second metal pattern MP2 is formed on the gate insulating layer GI, and a passivation layer PAS is formed on the second metal pattern MP2. The contact hole CNT is formed, so that it passes through the gate insulating layer GI and the passivation layer PAS and exposes the first and second metal patterns MP1 and MP2. The contact hole CNT may include a first contact hole CNT1, which passes through the gate insulating layer GI and the passivation layer PAS and exposes the first metal pattern MP1, and a second contact hole CNT2, which passes through the passivation layer PAS and exposes the second metal pattern MP2. In this instance, the third metal pattern MP3 may be formed on the passivation layer PAS, so that it is connected to the first metal pattern MP1 through the first contact hole CNT1 and is connected to the second metal pattern MP2 through the second contact hole CNT2.

Figure 8:
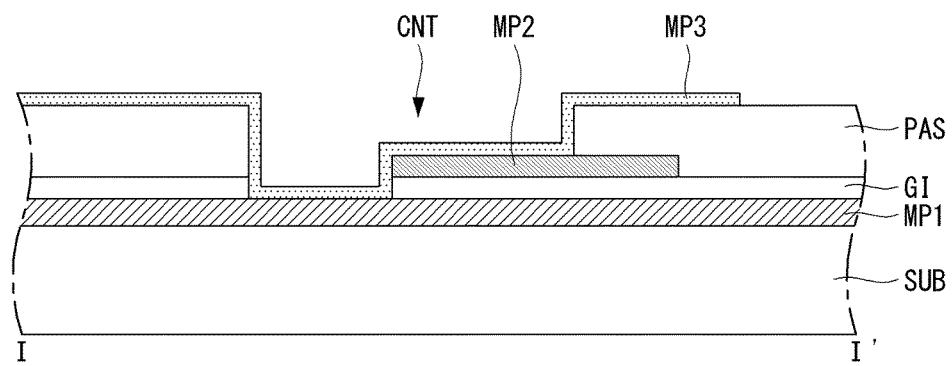
FIG. 8 is another cross-sectional view taken along line I-I' of FIG. 6A.

FIG. 8 is another cross-sectional view taken along line I-I' of FIG. 6A. More specifically, FIG. 8 shows a first metal pattern MP1 formed of a gate metal pattern, a second metal pattern MP2 formed of a data metal pattern, and a third metal pattern MP3 formed of a transparent electrode pattern for the sake of brevity and ease of reading. Other types of metal patterns may be used for the first to third metal patterns MP1 to MP3. For example, the first metal pattern MP1 may be formed of a data metal pattern, the second metal pattern MP2 may be formed of a gate metal pattern, and the third metal pattern MP3 may be formed of a transparent electrode pattern.

As shown in FIG. 8, the first metal pattern MP1 is formed on the lower substrate SUB, and a gate insulating layer GI is formed on the first metal pattern MP1. The second metal pattern MP2 is formed on the gate insulating layer GI, and a passivation layer PAS is formed on the second metal pattern MP2. The contact hole CNT is formed, so that it passes through the gate insulating layer GI and the passivation layer PAS and exposes the first and second metal patterns MP1 and MP2. Namely, the contact hole CNT may pass through the gate insulating layer GI and the passivation layer PAS and expose the second metal pattern MP2 as well as the first metal pattern MP1. In this instance, the third metal pattern MP3 may be formed on the passivation layer PAS, so that it is connected to the first metal pattern MP1 and the second metal pattern MP2 through the contact hole CNT.

Figure 9A:
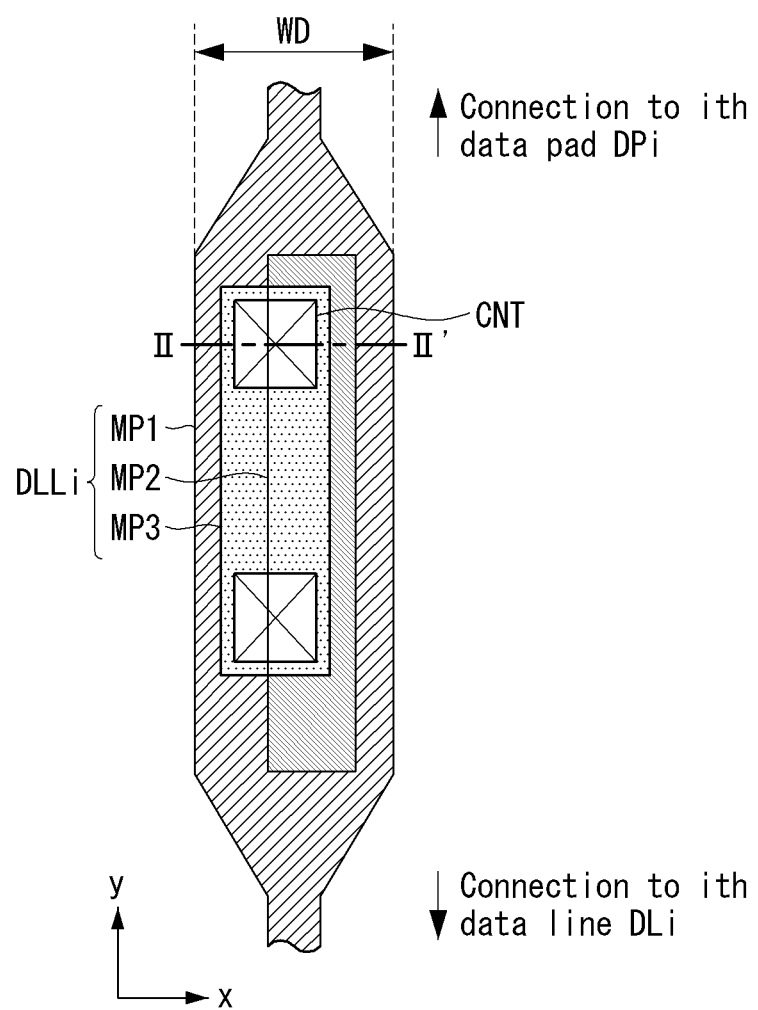
FIGS. 9A and 9B show in detail an ith data link line and a kth data link line according to a fourth embodiment of the invention.
Figure 9B:
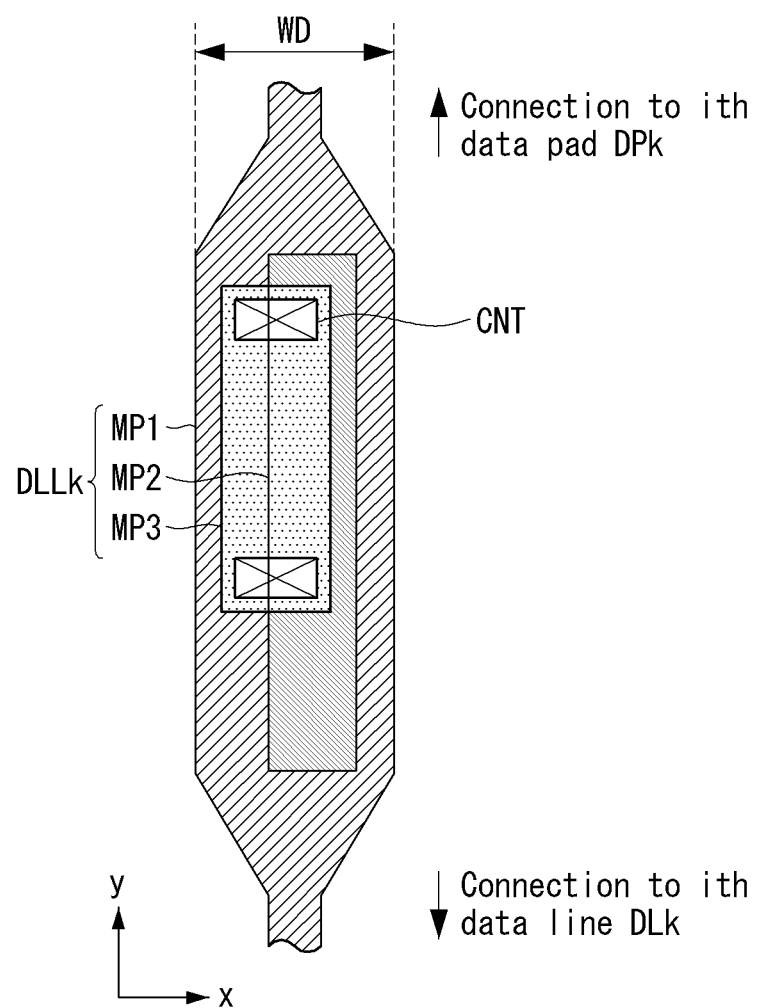

FIGS. 9A and 9B show in detail an ith data link line and a kth data link line according to the fourth embodiment of the invention. More specifically, FIG. 9A shows an ith data link line DLLi, where 'i' is a natural number satisfying 1≤i<n/2, and FIG. 9B shows a kth data link line DLLk, where 'k' is a natural number satisfying i<k≤n/2. The ith data link line DLLi indicates one of first to (n/2−1)th data link lines DLL1 to DLLn/2−1, and the kth data link line DLLk indicates one of ith to (n/2)th data link lines DLLi to DLLn/2. One end of the ith data link line DLLi is connected to an ith data pad DPi, and the other end of the ith data link line DLLi is connected to an ith data line DLi. One end of the kth data link line DLLk is connected to a kth data pad DPk, and the other end of the kth data link line DLLk is connected to a kth data line DLk.

As shown in FIGS. 9A and 9B, at least one of the first to (n/2)th data link lines DLL1 to DLLn/2 includes a first metal pattern MP1, a second metal pattern MP2, a contact hole CNT exposing the first and second metal patterns MP1 and MP2, and a third metal pattern MP3 connected to the first and second metal patterns MP1 and MP2 through the contact hole CNT.

As shown in FIGS. 9A and 9B, the first to third metal patterns MP1, MP2, and MP3 may extend along a longitudinal direction (for example, y-axis direction) of the data link lines. A width of the first metal pattern MP1 may be greater than widths of the second and third metal patterns MP2 and MP3. The first metal pattern MP1 may partially overlap the second metal pattern MP2. The third metal pattern MP3 may partially overlap the first and second metal patterns MP1 and MP2. The first to third metal patterns MP1 to MP3 are not limited to the configuration shown in FIGS. 9A and 9B. Other configurations may be used for the first to third metal patterns MP1 to MP3.

Because the first to third metal patterns MP1 to MP3 contact one another in the contact hole CNT, a contact resistance between the first to third metal patterns MP1 to MP3 is generated in the contact hole CNT. In this instance, the contact hole CNT formed in each of the ith to kth data link lines DLLi to DLLk may serve as a resistor. Further, the contact holes CNT formed in the ith to kth data link lines DLLi to DLLk may have the same effect as resistors connected in parallel. As the size of the contact hole CNT increases, the contact resistance decreases.

The first to (n/2)th data link lines DLL1 to DLLn/2 may be designed to have the same width WD. The size of the contact holes CNT of the ith data link line DLLi may be designed to be greater than the size of the contact holes CNT of the kth data link line DLLk. Hence, a combined resistance of the ith data link line DLLi is less than a combined resistance of the kth data link line DLLk. Namely, in the fourth embodiment of the invention, because a length of the ith data link line DLLi is longer than a length of the kth data link line DLLk, the combined resistance of the ith data link line DLLi is designed to be less than the combined resistance of the kth data link line DLLk.

In other words, the lengths of the ith to kth data link lines DLLi to DLLk decrease as they go from the ith data link line DLLi to the kth data link line DLLk. Therefore, the fourth embodiment of the invention gradually reduces the size of the contact holes CNT in the ith to kth data link lines DLLi to DLLk, thereby gradually increasing the combined resistances of the ith to kth data link lines DLLi to DLLk. As a result, the fourth embodiment of the invention can uniformly design the resistances of the first to (n/2)th data link lines DLL1 to DLLn/2. Further, lengths of pth to qth data link lines DLLp to DLLq increase as they go from the pth data link line DLLp to the qth data link line DLLq, where 'p' is a natural number satisfying n/2≤p<n, and 'q' is a natural number satisfying p<q≤n. Therefore, the fourth embodiment of the invention gradually increases the size of the contact holes CNT in the pth to qth data link lines DLLp to DLLq, thereby gradually reducing combined resistances of the pth to qth data link lines DLLp to DLLq. As a result, the fourth embodiment of the invention can uniformly design the resistances of the (n/2)th to nth data link lines DLLn/2 to DLLn. Namely, the fourth embodiment of the invention can minimize the resistance difference between the first to nth data link lines DLL1 to DLLn.

Figure 10:
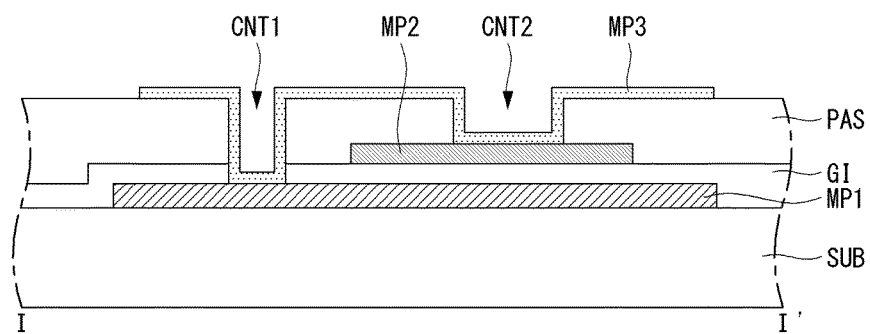
FIG. 10 is a cross-sectional view taken along line II-II' of FIG. 9A.

FIG. 10 is a cross-sectional view taken along line II-II' of FIG. 9A. More specifically, FIG. 10 shows a first metal pattern MP1 formed of a gate metal pattern, a second metal pattern MP2 formed of a data metal pattern, and a third metal pattern MP3 formed of a transparent electrode pattern for the sake of brevity and ease of reading. Other types of metal patterns may be used for the first to third metal patterns MP1 to MP3. For example, the first metal pattern MP1 may be formed of a data metal pattern, the second metal pattern MP2 may be formed of a gate metal pattern, and the third metal pattern MP3 may be formed of a transparent electrode pattern.

As shown in FIG. 10, the first metal pattern MP1 is formed on the lower substrate SUB, and a gate insulating layer GI is formed on the first metal pattern MP1. The second metal pattern MP2 is formed on the gate insulating layer GI, and a passivation layer PAS is formed on the second metal pattern MP2. The contact hole CNT is formed, so that it passes through the gate insulating layer GI and the passivation layer PAS and exposes the first and second metal patterns MP1 and MP2. The contact hole CNT may include a first contact hole CNT1, which passes through the gate insulating layer GI and the passivation layer PAS and exposes the first metal pattern MP1, and a second contact hole CNT2, which passes through the passivation layer PAS and exposes the second metal pattern MP2. In this instance, the third metal pattern MP3 may be formed on the passivation layer PAS, so that it is connected to the first metal pattern MP1 through the first contact hole CNT1 and is connected to the second metal pattern MP2 through the second contact hole CNT2.

Figure 11:
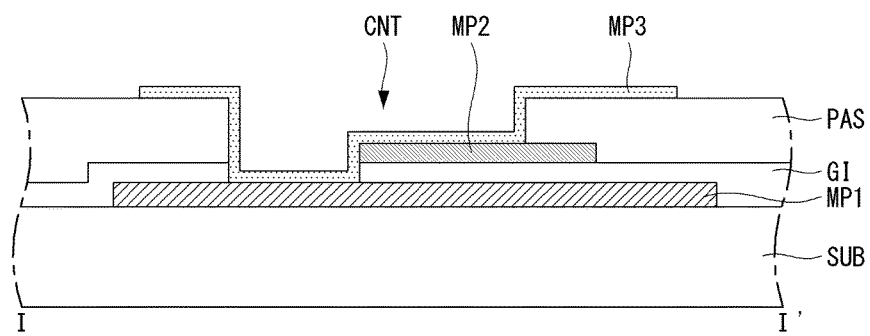
FIG. 11 is another cross-sectional view taken along line II-II' of FIG. 9A.

FIG. 11 is another cross-sectional view taken along line II-II' of FIG. 9A. More specifically, FIG. 11 shows a first metal pattern MP1 formed of a gate metal pattern, a second metal pattern MP2 formed of a data metal pattern, and a third metal pattern MP3 formed of a transparent electrode pattern for the sake of brevity and ease of reading. Other types of metal patterns may be used for the first to third metal patterns MP1 to MP3. For example, the first metal pattern MP1 may be formed of a data metal pattern, the second metal pattern MP2 may be formed of a gate metal pattern, and the third metal pattern MP3 may be formed of a transparent electrode pattern.

As shown in FIG. 11, the first metal pattern MP1 is formed on the lower substrate SUB, and a gate insulating layer GI is formed on the first metal pattern MP1. The second metal pattern MP2 is formed on the gate insulating layer GI, and a passivation layer PAS is formed on the second metal pattern MP2. The contact hole CNT is formed, so that it passes through the gate insulating layer GI and the passivation layer PAS and exposes the first and second metal patterns MP1 and MP2. Namely, the contact hole CNT may pass through the gate insulating layer GI and the passivation layer PAS and expose the second metal pattern MP2 as well as the first metal pattern MP1. In this instance, the third metal pattern MP3 may be formed on the passivation layer PAS, so that it is connected to the first metal pattern MP1 and the second metal pattern MP2 through the contact hole CNT.

As described above, the first to fourth embodiments of the invention change the widths and the number of holes formed in the ith to kth data link lines and the number and the sizes of contact holes formed in the ith to kth data link lines, thereby uniformly designing the resistances of the first to nth data link lines. As a result, the first to fourth embodiments of the invention can minimize the resistance difference between the first to nth data link lines.

The first to fourth embodiments of the invention may be implemented through a combination thereof. For example, the embodiment of the invention may simultaneously change the widths and the number of holes of the ith to kth data link lines, and also may simultaneously change the number and the sizes of contact holes of the ith to kth data link lines. Further, the embodiment of the invention may simultaneously change the widths of the holes of the ith to kth data link lines and the number and/or the sizes of contact holes of the ith to kth data link lines. Further, the embodiment of the invention may simultaneously change the number of holes of the ith to kth data link lines and the number and/or the sizes of contact holes of the ith to kth data link lines.

The first to fourth embodiments of the invention were described based on the first to nth data link lines DLL1 to DLLn. However, the first to mth gate pads GP1 to GPm and the first to mth gate link lines GLL1 to GLLm formed in a portion 'B' of FIG. 2 may be formed in conformity with the design manner shown in FIG. 3, and thus the first to mth gate link lines GLL1 to GLLm may have different resistances depending on their positions as described above. In this instance, the problem generated by a resistance difference between the first to mth gate link lines GLL1 to GLLm may be solved through the methods described in the first to fourth embodiments of the invention.

Although the embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including first to third signal lines formed in a display area in which pixels are formed, first to third link lines which are formed in a non-display area excluding the display area from the display panel and are respectively connected to the first to third signal lines, and first to third pads respectively connected to the first to third link lines in the non-display area; and
a driver integrated circuit (IC) which is connected to the first to third pads and supplies driving signals to the first to third signal lines through the first to third link lines,
wherein the first pad is connected to a first part of the driver IC, the second pad is connected to a second part of the driver IC, the third pad is connected to a third part of the driver IC, and the third part is closer to a middle part of the drive IC than the second part which is closer to the middle part than the first part,
wherein the first link line has a first length, the second link line has a second length, and the third link line has a third length, the first length being longer than the second length which is longer than the third length,
wherein a first distance between the first link line and the second link line is longer than a second distance between the second link line and the third link line,
wherein each of the first link line, the second link line and the third link line includes a first connection part connected to a corresponding pad, a second connection part connected to a corresponding signal line and a third connection part connecting the first connection part and the second connection part, wherein the first connection parts and the second connection parts of the first link line, the second link line and the third link line are parallel to the signal lines, and the third connection parts of the first link line, the second link line and the third link line are not parallel to the signal lines, and
wherein a length of the third connection part of the first link line is longer than a length of the third connection part of the second link line, and the length of the third connection part of the second link line is longer than a length of the third connection part of the third link line,
wherein the first link line includes a first resistance area in which a first number of holes, each of which has a slit shape elongated along a longitudinal direction of the first link line, are disposed; the second link line includes a second resistance area in which a second number of holes, each of which has the slit shape, are disposed; and the third link line includes a third resistance area in which a third number of holes, each of which has the slit shape, are disposed, the first number being smaller than the second number which is smaller than the third number,
wherein a width of the second connection part linearly increases as the second connection part approaches its corresponding resistance area, and a width of the third connection part linearly increases as the third connection part approaches its corresponding resistance area,
wherein a first width of the first resistance area, a second width of the second resistance area and a third width of the third resistance area are same,
wherein the first width of the first resistance area is greater than a width of an area other than the first resistance area in the first link line, the second width of the second resistance area is greater than a width of an area other than the second resistance area in the second link line, and the third width of the third resistance area is greater than a width of an area other than the third resistance area in the third link line, and
wherein when the first to third signal lines are data lines, the first to third link lines are data link lines, and wherein when the first to third signal lines are gate lines, the first to third link lines are gate link lines.

2. The display device of claim 1, wherein a width of a hole of an ith link line is less than a width of a hole of a kth link line, where 'i' is a natural number satisfying $1 \le i < n/2$, and 'k' is a natural number satisfying $i < k \le n/2$,
wherein a width of a hole of a pth link line is greater than a width of a hole of a qth link line, where 'p' is a natural number satisfying $n/2 \le p < n$, and 'q' is a natural number satisfying $p < q \le n$.

3. The display device of claim 1, wherein widths of holes of ith to kth link lines increase as they go from the ith link line to the kth link line, where 'i' is a natural number satisfying $1 \le i < n/2$, and 'k' is a natural number satisfying $i < k \le n/2$,
wherein widths of holes of pth to qth link lines decrease as they go from the pth link line to the qth link line, where 'p' is a natural number satisfying $n/2 \le p < n$, and 'q' is a natural number satisfying $p < q \le n$.

4. The display device of claim 1, wherein the number of holes of an ith link line is less than the number of holes of a kth link line, where T is a natural number satisfying $1 \le i < n/2$, 'k' is a natural number satisfying $i < k \le n/2$, and 'n' is an even natural number equal to or greater than 2, and
wherein the number of holes of a pth link line is more than the number of holes of a qth link line, where 'p' is a natural number satisfying $n/2 \le p < n$, and 'q' is a natural number satisfying $p < q \le n$.

5. The display device of claim 1, wherein the first to third signal lines are data lines, and the first to third link lines are data link lines.

6. The display device of claim 1, wherein the first to third signal lines are gate lines, and the first to third link lines are gate link lines.

7. The display device of claim 1, wherein widths of the holes of the first link line, the second link line and the third link line are substantially same.

8. The display device of claim 1, wherein a distance between the third connection part of the first link line and the third connection part of the second link line is longer than a distance between the third connection part of the second link line and the third connection part of the third link line.

9. The display device of claim 1, wherein a distance between the second connection part of the first link line and the second connection part of the second link line is same as a distance between the second connection part of the second link line and the second connection part of the third link line.

* * * * *